Oct. 18, 1949.    O. V. ANDERSON    2,484,801
CENTERING DEVICE
Filed July 1, 1944

Inventor
Olaf V. Anderson
by Nathaniel Frucht
Attorney

Patented Oct. 18, 1949

2,484,801

UNITED STATES PATENT OFFICE 2,484,801

CENTERING DEVICE

Olaf V. Anderson, Providence, R. I.

Application July 1, 1944, Serial No. 543,068

1 Claim. (Cl. 33—169)

The present invention relates to machine tool apparatus, and has particular reference to centering devices for lathe operations.

The principal object of the invention is to provide a simple and easily operated centering device for quickly determining when the work is accurately centered in the lathe.

Another object of the invention is to provide a centering bar made of a small number of readily manufactured and assembled parts.

With the above and other objects and advantageous features in view, the invention consists of a novel arrangement of parts more fully disclosed in the detailed description following, in conjunction with the accompanying drawings, and more specifically defined in the claim appended thereto.

It has been found desirable to provide a simple, easily operated device for determining when a piece of work is accurately centered in a lathe. To this end, I have devised an elongated centering bar construction, one end of the bar being adapted to engage the center of the work and the other end of the bar being adapted to seat on the tail stock of the lathe, whereupon a slow rotation of the head chuck immediately indicates whether or not the work is accurately centered in the head stock. If the work is accurately centered the longitudinal axis of the centering bar is aligned with the head and tail centers and there is no off-center rotation of the centering bar; if the work is not centered the head stock end of the centering bar will describe a circle the center of which is the proper work centering location.

Figure 1:
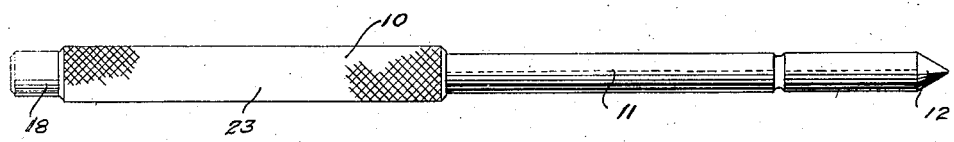
Fig. 1 is an elevation of an illustrative centering bar construction embodying the invention.
Figure 2:
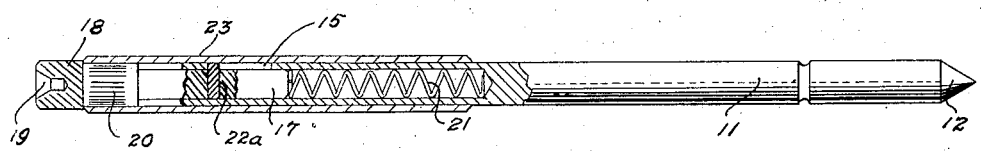
Fig. 2 is a view similar to Fig. 1, parts being in section and other parts broken away.
Figure 3:
Fig. 3 is a perspective view of the tail stock portion of the centering bar before assembly.
Figure 4:
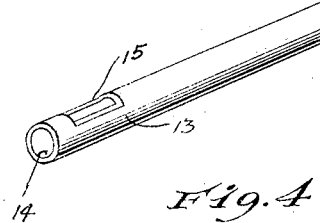
Fig. 4 is a perspective view of the head stock portion of the centering bar before assembly.

Referring to the drawings, the centering bar 10 includes a head stock rod member 11, see Fig. 4, which has one end 12 formed as a centering cone, the other end 13 having a longitudinal bore 14 which extends inwardly for a predetermined distance, the wall of the bore being cut away adjacent the end to provide a longitudinual slot opening 15. A cooperating tail stock member 16, see Fig. 3, is preferably formed from solid stock, with a cylindrical inner end 17 adapted to slidingly seat within the bore 14, the other end 18 being of larger diameter than the external diameter of the rod member 11 and having a centering recess 19 in its end, a knurled cylindrical boss 20 being positioned contiguous to the end 18 and being of slightly greater diameter than the rod member 11.

A compression spring 21 is positioned in the bore 14, the end 17 of the member 16 is seated in the bore, and a lock pin 22 is passed through the slot 15 to seat in a transverse pin bore 22a in the end 17 to securely lock the two members together. A sleeve 23, preferably knurled, and which is of the proper internal diameter to slidably telescope over the rod member 11, is then passed over the cone end of the rod member 11 and is force-pressed over the knurled boss 20 to effectively seat over the slot opening 15 and prevent dislodging of the pin 22, thus enclosing all the operating parts of the centering bar.

The above described construction provides a simple and effective centering bar arrangement which can be manufactured at low cost, and which provides a substantial amount of resilient play between the ends of the centering bar to permit changing the overall length and thus facilitating its use. When work to be machined is mounted in the head stock the centering cone 12 is inserted in the work center, the sleeve is pulled to shorten the length, and the tail stock is moved up to seat in the centering recess 19. The work is then slowly turned, preferably by hand, and the resulting rotation of the centering bar immediately discloses whether the work is accurately centered. If the work is not centered, the head stock end of the centering bar describes a circle the radius of which is the distance off center, whereby the necessary correction is quickly and easily made. If desired, a precision indicator gauge may be used to determine the exact amount of off-centering. As soon as the work is accurately centered, the centering bar is quickly removed by pulling the sleeve to compress the spring and shorten the length.

While I have described a specific constructional embodiment of my invention, it is obvious that changes in the size, the shape, and the arrangement of the parts may be made to meet the requirements for different centering uses and that the invention may be applied to different centering indicator constructions, without departing from the spirit and the scope of the invention as defined in the appended claim.

I claim:

A centering bar construction for a lathe, comprising a rod member having a centering cone at one end and a longitudinal bore in the other end, said bore end having a longitudinal wall slot, a second member having a centering recess in one end and having the other end slidably seated in said bore, a compression spring in said bore normally urging the members into overall length extending relation, pin means positioned in said wall slot and seated in the slidable end of the second member, whereby said members have relative movement corresponding to the movement of the pin means in the wall slot, and a sleeve secured to the second member and slidable over the other member and extending over said wall slot.

OLAF V. ANDERSON.

REFERENCES CITED

The following references are of record in the file of this patent:

UNITED STATES PATENTS

| Number | Name | Date |
|---|---|---|
| 685,288 | Miller | Oct. 29, 1901 |
| 1,414,483 | Novitzky | May 2, 1922 |